United States Patent [19]

Ewers

[11] Patent Number: 4,499,747
[45] Date of Patent: Feb. 19, 1985

[54] POWER DRIVEN DISC CULTIVATOR APPARATUS

[76] Inventor: Frederick H. Ewers, The White House, Badby Lodge Farm, Daventry, Northamptonshire, N11 6OD, England

[21] Appl. No.: 457,287

[22] Filed: Jan. 12, 1983

[30] Foreign Application Priority Data

Jan. 14, 1982 [GB] United Kingdom ............... 8201054
Jul. 5, 1982 [GB] United Kingdom ............... 8219334

[51] Int. Cl.³ ............................................. A01B 9/00
[52] U.S. Cl. ........................................ 172/68; 172/55; 172/71; 172/596
[58] Field of Search ............. 172/51, 52, 55, 68, 172/120, 584, 594, 595, 596, 599, 604, 71

[56] References Cited

U.S. PATENT DOCUMENTS

| | | | |
|---|---|---|---|
| 1,158,110 | 10/1915 | Cook | 172/120 |
| 2,725,812 | 12/1955 | Frank | 172/599 |
| 3,191,691 | 6/1965 | Newkirk | 172/584 X |
| 4,174,756 | 11/1979 | De Haai | 172/55 |

FOREIGN PATENT DOCUMENTS

| | | | |
|---|---|---|---|
| 1957040 | 9/1970 | Fed. Rep. of Germany | 172/51 |
| 774193 | 9/1934 | France | 172/55 |

*Primary Examiner*—Richard T. Stouffer
*Attorney, Agent, or Firm*—Quaintance & Murphy

[57] ABSTRACT

A power driven disc cultivator apparatus includes a main frame to which are connected a main sub-frame assembly and at least one second sub-frame assembly. The main sub-frame assembly mounts a shaft provided with spaced cultivator discs which are constrained to rotate with the shaft. The shaft and thus the discs are power driven at a rate independent of the speed of advance of the tractor or like vehicle towing the cultivator apparatus. The main sub-frame assembly is located at the forward end of the main frame. The second sub-frames mount shafts which are not power driven. The sub-frames can be selectively positioned lengthwise and angularly relative to the main frame.

3 Claims, 8 Drawing Figures

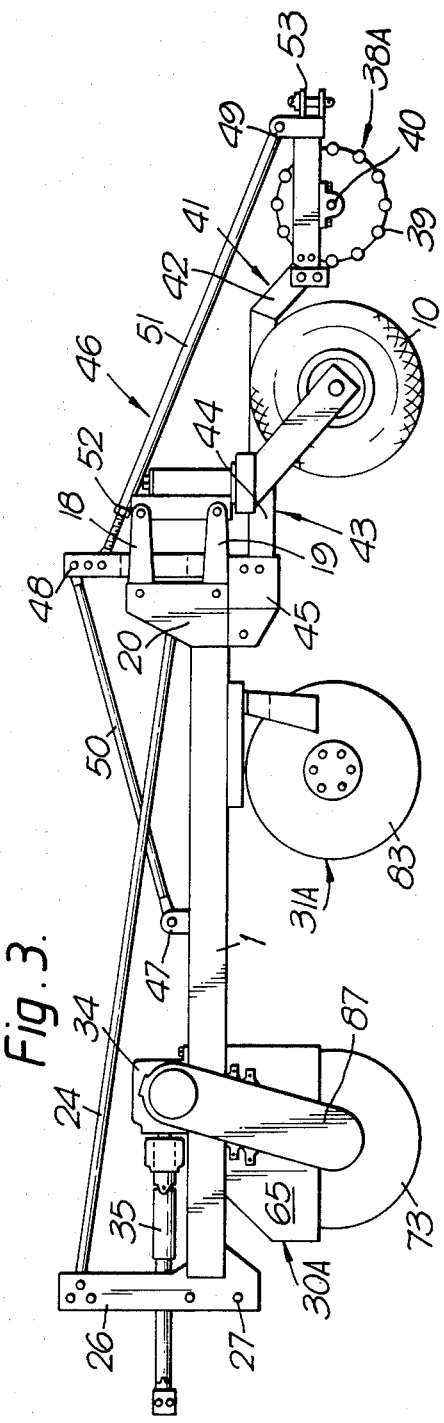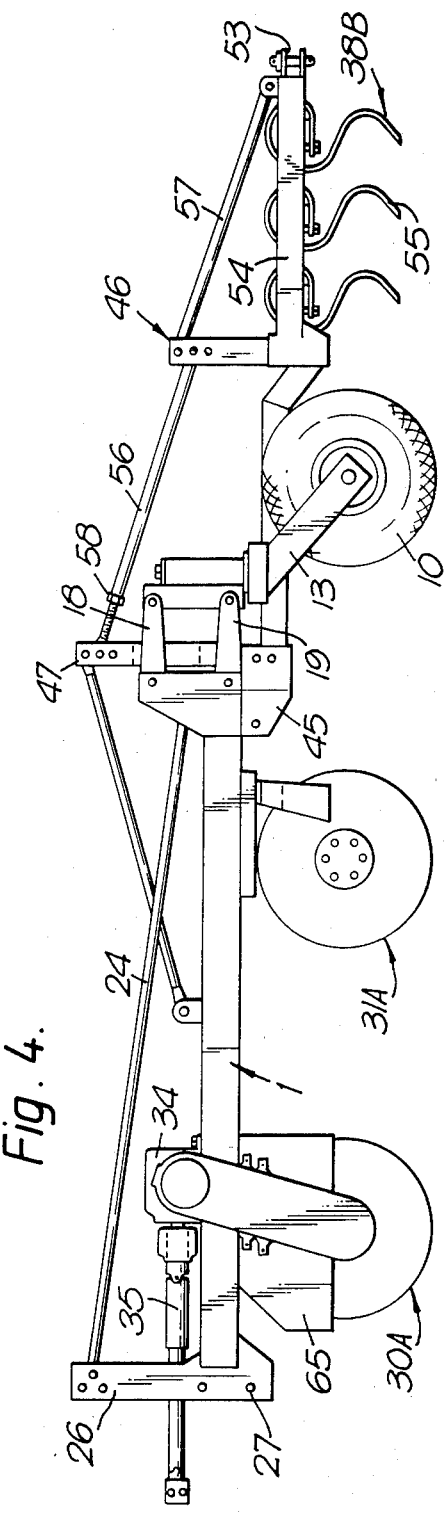

POWER DRIVEN DISC CULTIVATOR APPARATUS

FIELD OF THE INVENTION

This invention relates to agricultural machinery and more particularly to machinery for use in the actual cultivation of land.

In particular, the present invention is concerned with machinery which is capable of performing the land cultivation operation commonly called harrowing or cultivating.

BACKGROUND TO THE INVENTION

One well known form of harrowing or cultivating farm land is to mount a plurality of dished discs upon a shaft carried from a suitable support frame and to tow the frame and thus the associated discs behind a tractor in such manner that the discs are able to cut into the upper layers of the soil and in so doing break down such layers into a more friable or loosened condition.

It is also well known that an important factor in relation to farm cultivation is that a cultivation process should not unduly compact the soil and should, if possible, produce an overall uniform result.

Thus in relation to harrowing it is an important requirement that the soil should be as uniformly cultivated and that, in addition, the harrowing discs used should be able to penetrate the ground in as uniform manner as possible.

In other words, it is important to ensure that during harrowing the operational conditions are such that the harrow discs cut the soil rather than merey sliding or slipping over the surface.

In relation to the harrowing operation it is important to understand that the usefulness of a harrow having rotatable discs as the harrow tools differs from soil condition to soil condition. For example, the usefulness for working upon a heavy soil, i.e., clay or water laden soil may well be quite different from operation in light, i.e., sandy, soils.

SUMMARIES OF THE INVENTION

According to a first aspect of the invention there is provided a harrow type cultivator apparatus including a first group, line or set of disc cultivator elements carried by a shaft or the like structure mounted in or by a frame; at least one further group, line or set of disc cultivator elements carried by an associated shaft or like structure mounted in or by a frame, which may or may not be said first mentioned frame; means for rotating the disc cultivator elements of at least one of said groups, lines or sets; and means for enabling the means for rotating to receive drive from a tractor power output arrangement or other form of drive.

Preferably, the groups, lines or sets of disc cultivator elements are arranged one behind the other in relation to the direction of advance of the cultivator apparatus, and with the leading group, line or set of disc cultivator elements providing the driven group, line or set of disc cultivator elements, and with the rotation of the remaining group (s), lines(s) or set(s) being caused to rotate solely as a result of the operational advance of the cultivator apparatus.

Preferably, the axes of rotation of the first group, line or set of disc cultivator elements are arranged at an angle relative to the direction of advance of the cultivator apparatus which is other than a right angle.

In a preferred form of the apparatus the drive to the driven group, line or set of disc cultivator elements is applied at one end region of the associated shaft or the like structure, and the axis of rotation of the driven shaft or like structure is angled forwardly of said end region so that the other end of the shaft or like structure is in advance of the one end region.

Preferably, the axis or axes of rotation of the shaft (s) or like structure (s) of any other group (s), line (s) or set (s) of disc cultivator elements is or are angled in the opposite sense to that of the driven disc cultivator elements with respect to the direction of advance of the apparatus.

Conveniently, when there are two groups, lines or sets of disc cultivator elements the shafts or like structures therefor are equiangularly angled with respect to the direction of advance of the apparatus.

BRIEF DESCRIPTION OF THE DRAWINGS

For a better understanding of the invention and to show how to carry the same into effect reference will now be made to the accompanying drawings in which

FIG. 3 is a side view of the apparatus of FIG. 1 when associated with a soil crumbler roller unit;

FIG. 4 is a side view of the apparatus of FIG. 1 when associated with a secondary cultivator incorporating a group of spring type tines as cultivating elements;

DESCRIPTION OF THE PREFERRED EMBODIMENT

Figure 1:
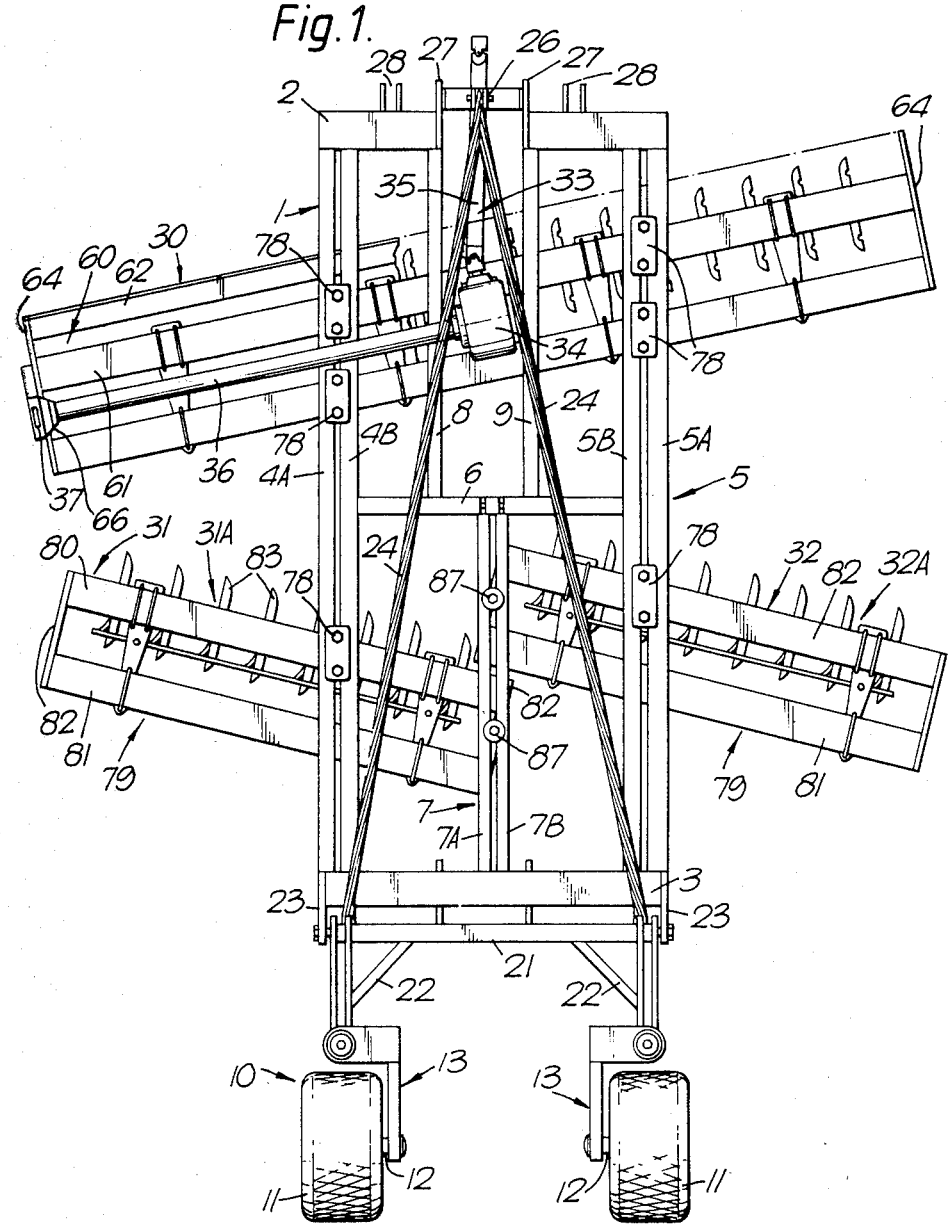
FIG. 1 is a schematic plan view of a first embodiment of a disc harrow type cultivator apparatus incorporating both groups of driven and non-driven cultivator disc elements.
Figure 2:
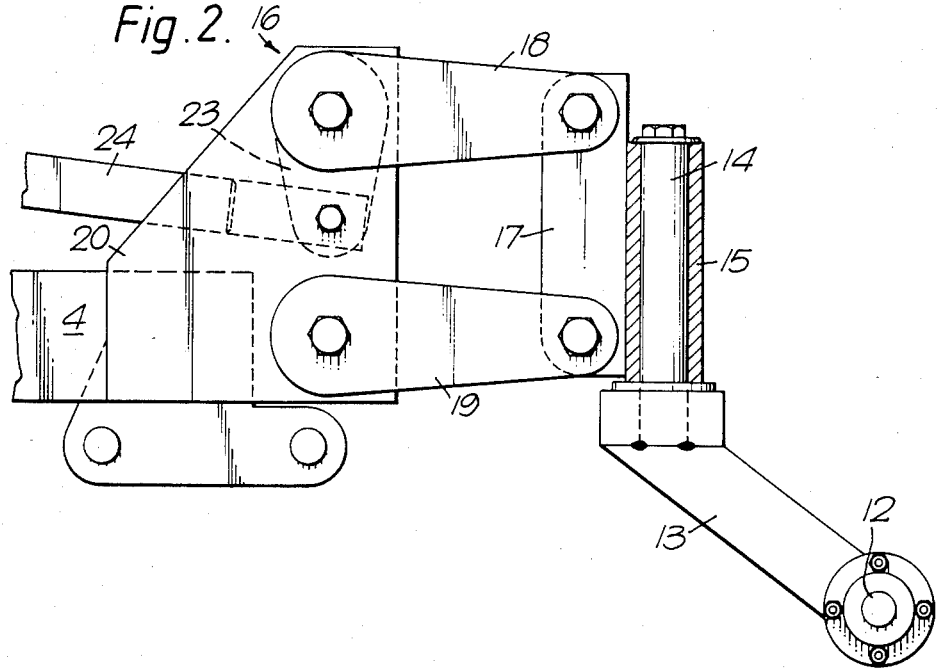
FIG. 2 is a part sectional side view of a detail of the cultivator apparatus of FIG. 1.

Referring now to the drawings and more particularly to FIGS. 1 and 2, the cultivator apparatus shown therein includes a generally rectangular main frame 1 including a front rail 2, a rear rail 3, and side rail assemblies 4 and 5, including side-by-side rail pairs 4A,4B and 5A,5B respectively. A cross rail 6 bridges the rails 4B and 5B. The rails 3 and 6 are interconnected by a further rail pair assembly 7 including rails 7A and 7B. Rails 8 and 9 interconnect the rails 2 and 6.

Castorable jocky wheel units 10 are located at the rear ends of the main frame 1. Each unit includes a wheel 11 on an axle 12 journalled in a support assembly 13 having a shaft 14 engaging in a vertical sleeve 15 to allow the castoring action.

The support assembly 13 connects with the main frame through a wheel lift arrangement 16. Plates 17 integral with the sleeves 15 are pivotally connected to associated pairs of link arms 18, 19 forming part of the lift assembly 16. The links 19 are pivotally connected to associated main plates 20 secured to the rail assemblies 4 and 5 of the main frame. A shaft 21 is rotatably mounted in the plates 20. The links 18 are effectively secured to the shaft 21 so as to rotate therewith. Adjacent each link 18 there is provided a swing arm 23 which rotates with the shaft 21. Each swing arm 23 connects with an associated operating or control rod 24. The two control rods extend lengthwise of the frame 1 and are also inclined at an angle to the frame and are connected to the upper ends of a pivoted control member 26 which is mounted from the front rail 2 by way of plates 27. Two sets of connecting links 2B are provided for coupling the main frame 1 to conventional towing chains, bars or the like.

The main frame 1 essentially serves to support sub-frame units 30, 31 and 32 which in turn mount groups, lines or sets of disc cultivator elements or the like 30A, 31A, and 32A respectively. The construction of the sub-frame units and associated disc elements will be considered in greater detail hereinafter. The group, line or set of disc cultivator elements 30A of the sub-frame unit 30 are power driven, that is power rotated, from the power take of facility of a towing tractor or the like or by any other convenient means of producing a power drive. The power drive involves a power drive 33 including a gear box unit 34 having an input shaft 35 adapted (as will be discussed hereinafter) for connection to a tractor power take-off, and intermediate drive shaft arrangement 36 connecting with a chain drive arrangement 37, to be discussed hereinafter, to rotate the disc cultivator discs 30A.

The apparatus as so far described may be utilised with various attachments which are conveniently attachable to the rear end region of the main frame 1, as may be seen from FIGS. 3 and 4. These Figures are side views of the apparatus of FIG. 1 respectively showing the mounting to the main frame 1 of a trailing soil crumbler roll unit 38A and a set of spring tines of a spring tine type of harrow unit 38B.

In FIG. 3 the crumbler roller unit 38A includes a crumbler roll 39 journalled in bearing blocks 40 carried from a support frame 41. The frame 41 includes side frame members 42, located one to each side of the unit 38A. The front ends of the members 42 connect with a framework 43 which, in turn, connects with the side rails 4A and 5A of the main frame 1. As shown the framework 43 includes side rails 44 which connect with lugs 45 connected with the side rails 4, 5 of the main frame 1.

The crumbler unit 38A is positionally braced with respect to the main frame 1 by means of a tie bar arrangement 46 including lugs 47 on the main frame 1; brackets or the like 48 upstanding from the main frame 1; brackets 49 upstanding from the support frame 41; tie rods 50 interconnecting the lugs 47 and brackets 48; and tie rods 51 interconnecting the brackets 48 and the brackets 49.

Screw adjustment means 52 are provided for effecting positional adjustment of the support frame 41 with respect to the main frame 1.

A towing lug arrangement 53 is provided at the rear end of the support frame 41 to enable the attachment of additional soil working implements in tandum with the disc cultivator and crumbler unit.

The arrangement of FIG. 4 is generally similar to that of FIG. 3 except that the crumbler unit 38A is replaced by the tined cultivator unit 38B, the latter comprising a support frame 54 mounting a plurality of springable tines 55, the FIG. 4 showing three rows of said springable tines.

It will be observed that since the support frame 54 is somewhat longer than that associated with the crumbler roll 39 the bracing arrangements 46 are slightly varied by replacing the single bracing ties 51 by a pair of bracing ties 56 and 57, the ties 56 being adjustable in length by means of length adjusters 58.

A towing lug attachment 53 is provided at the rear of the frame 54.

Figure 7:
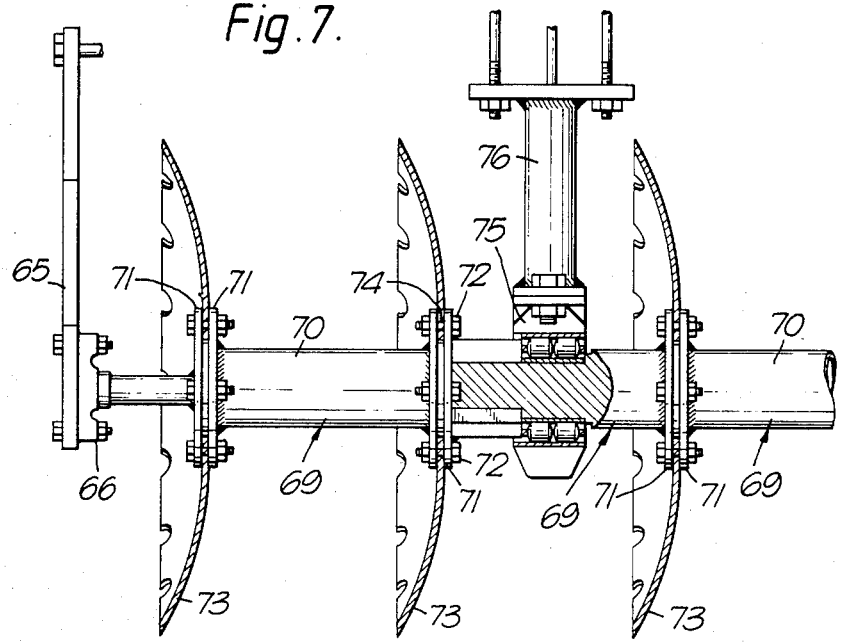
FIG. 7 is a part sectional view to an enlarged scale of a detail of the driven disc cultivator elements.
Figure 5:
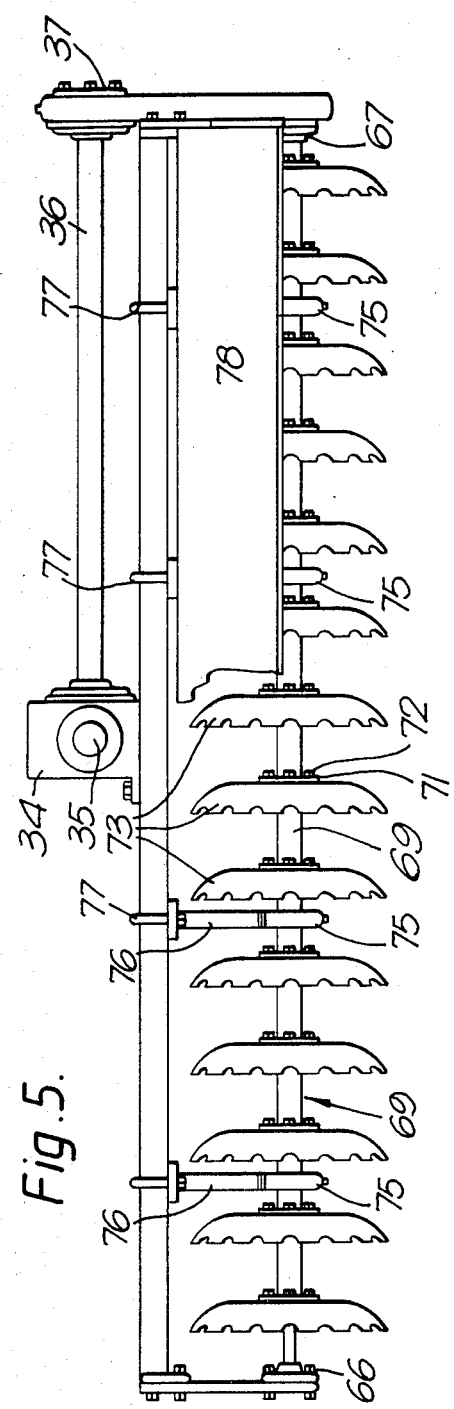
FIG. 5 is a front view of the driven group, line or set of disc cultivator elements.
Figure 6:
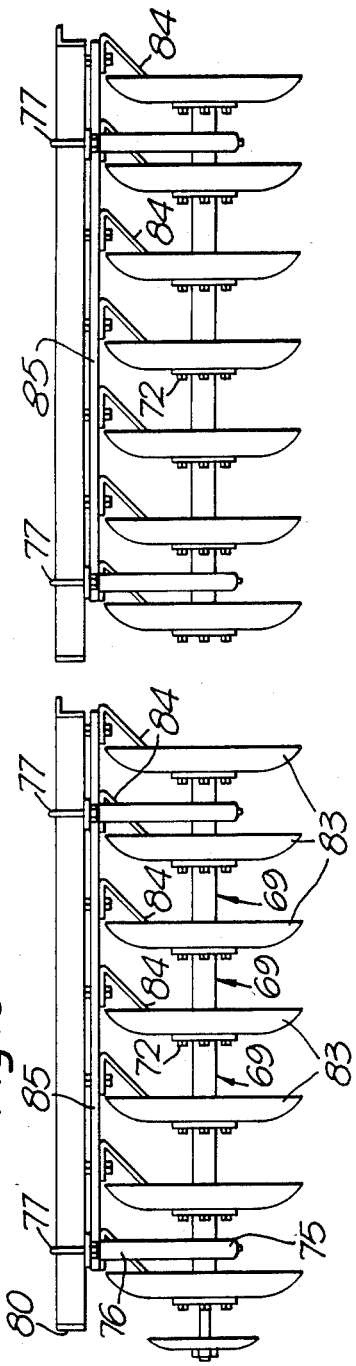
FIG. 6 is a front view of a particular arrangement of non-driven groups, lines or sets of disc cultivator elements.

The construction of the cultivator disc assemblies and their mode of connection with the main frame 1 and their mode of drive will be considered in greater detail in conjunction with the previously considered FIG. 1 and with the remaining FIGS. 5 to 7.

Referring now in particular to FIGS. 5 and 7. FIG. 5 is a front view of the driven disc cultivator assembly 30, and FIG. 7 is a part section to an enlarged scale of a detail of the arrangement of FIG. 5. The cultivator unit 30 includes a main frame 60 including three parallel rails, namely a middle or main rail 61 and front and rear outer rails 62 and 63. The rails are connected at the end regions thereof to inner end plates 64 which are reinforced by additional plates 65 (see FIGS. 3 and 4) which are of a generally triangular shape with the bases thereof lowermost. These plates 65 provide mountings for bearing units 66 and 67. (These will be considered in greater detail hereinafter.)

The actual cultivator blade assembly 30A of the unit 30 comprises a plurality of separate shaft forming elements or modules 69 each having a main body 70 and a flange 71 at each end of the body, the flanges 71 being provided with a ring of holes for receiving bolts 72.

As will be seen from FIGS. 5 and 7 the elements 69 are connected in end-to-end relationship with a disc cultivator element 73 located between each adjacent pair of facing flanges 71. The discs elements 73 are each apertured to provide a ring of bolt holes 74 which positionwise coincide with the holes for the bolts 72.

Certain of the shaft forming elements or modules 69 have the main body 70 thereof adapted to mount and locate bearing units 75 carried from hangers 76 suspended from the central beam 61 of the main frame 1, by means of U-shaped strap assemblies 77.

In the FIG. 5 it will be noted that the driven cultivator unit 30 utilises four of said bearing support arrangements.

Housing panels 78A of which only a part of one is shown are mountable from the front and rear rails 62, 63 these housing panels 78A serving as guards which shroud exposed regions of the driven disc elements.

The support frame 60 of the driven disc unit 30 is mounted to the main frame 1 by clamping or attachment arrangements 78 which are connected with the front and rear rails 62, 63 of the unit 30 and with the side rail assemblies 4 and 5. These attachment arrangements 78 allow the driven disc cultivator unit 30 to be selectively positional lengthwise of the side rail assemblies 4 and 5.

Referring now to FIG. 6 which is a front view of the trailing disc cultivator units 31 and 32. Since these units are of a similar construction only one will discussed in detail namely the unit 31. The unit 31 includes a frame 79 comprising parallely arranged rails 80, 81 bridged by end plates 82. As in the case of the driven disc cultivator elements of the unit 30 the discs 83 are mounted by shaft forming elements or modules 69 each having the end flanges 71 and main body 70. The flanges 71 are connected together by the bolts 72 and the interposed disc elements 83 to provide a group, line, set or gang of seven disc elements. The shaft elements or modules 69 are supported from the rail 80 by means of the previously considered hanger and bearing arrangements 75,76 and the U-shaped strap assemblies 77.

It will be noted that two of the bearing/hanger arrangements 75,76 are used to mount the gang of seven discs.

Each cultivator disc 83 is provided with a scraper blade 84 mounted upon a bar 85 which is inturn connected to the rear rail 82 of the support frame 79. These blades 84 are so positioned with respect to the discs 83 as to be able to at least reduce the possibility of build-up of soil, debris etc., within the dishing of the cultivator disc elements 83.

The frame 79 is connected to the main frame 1 of the apparatus by a support bracket 78 located intermediate the ends of the rail, and engaging with one of the rail assemblies 4 or 5, and a second bolt arrangement 87 co-operating with the rail assembly 7. These mounting arrangements make it possible to adjust the setting of the trailing disc element units 31 and 32 with respect to the main frame 1 and also the angular setting of the units 31, 32 with respect to the main frame 1.

Figure 8:
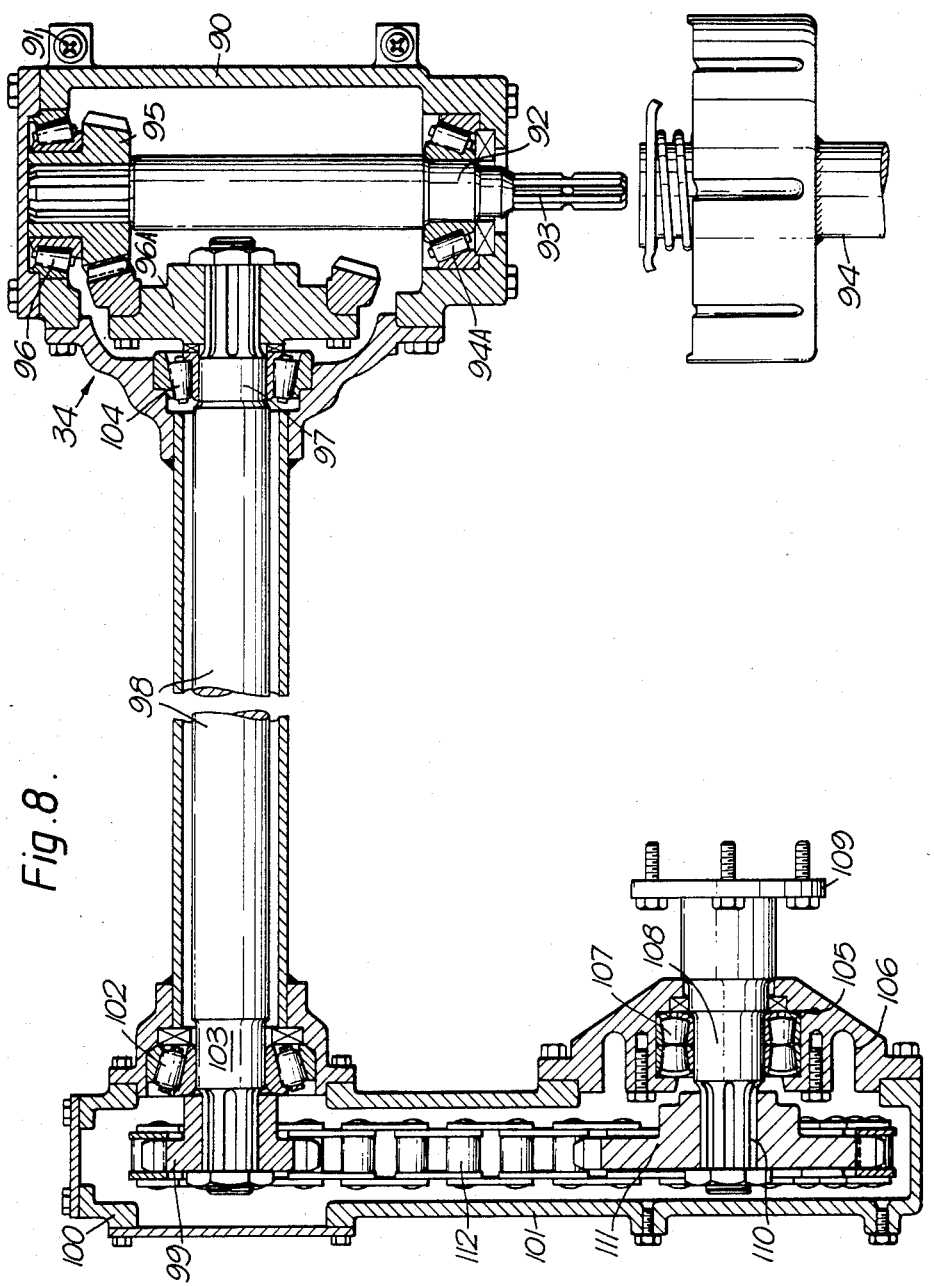
FIG. 8 is a part sectional view to an enlarged scale of the power drive arrangements provided for transmitting drive from a source of drive to the driven group, line or set of disc cultivator elements.

Referring now to FIG. 8 this is a cross-sectional view of the power drive arrangement 33 for the power drive of the power driven group, line or set of disc cultivator elements. As previously mentioned the arrangement 33 can conveniently be regarded as comprising three main sections, the drive input gear box 34; the drive output chain drive unit 37; and the intermediate drive shaft arrangement 36.

The drive input gear box 34 includes a housing 90 which is provided with lugs 91 whereby the gear box 34 can be secured to the rails 61 and 62 of the main frame 1. The box includes also main drive input shaft 92 having a splined end 93 adapted for engagement with a power take-off assembly 94 as is conventionally provided on a tractor or the like, the splined end of the shaft 92 is journalled in the housing 90 by means of a thrust and load bearing 94A. The other end of the shaft 92 carries a pinion 95 which is journalled in a thrust and load carrying bearing 96 located in the housing 90. The pinion 95 meshes with a crown wheel 96A connected to the input end 97 of the shaft 98 of the intermediate shaft unit 36. The other end of this shaft 98 carries a chain drive wheel 99. The shaft unit 36 includes an outer housing 100 which serves to connect with the housing 101 of the chain drive unit 37 and also to house a bearing 102 which supports the end 103 of the shaft 98 adjacent the chain drive wheel 99. A similar bearing 104 supports the end 97 of the shaft 98.

The chain drive unit housing 101 mounts a bearing unit 105 including a bearing mounting cup 106 and a bearing arrangement 107. A stub shaft or like structure 108 is journalled in the bearing arrangement 107. One end of this stub shaft is adapted for connection to an adjacent flange 71 of the disc element shaft element 69. This end is indicated at 109. The other end 110 of the stub shaft or like structure 108 is splined for receiving a chain wheel 111. A chain 112 connects the chain drive wheel 99 and the driven chain wheel 111.

It will be understood that the various drive ratios involved between the chain wheel 111; and chain drive wheel 99 and between the various gears of the gear box 34 will be selected so as to achieve the desired rate of rotation of the disc cultivator elements 30A.

In a particular installation the driven group of disc elements were driven at a rotational speed within a revolution range of 400 to 700 revolutions per minute. A specific range being within the range 450 to 650 revolutions per minute. Under test conditions in a heavy type of soil it was found that a speed within the range 500 to 600 revolutions per minute was suitable. It was also noted that in lighter soils i.e., of a sandy structure the higher rate of rotation could be used.

It is preferred that the disc elements 73, that is the driven elements, should be scolloped at the edge regions thereof. This has been indicated in the drawings by semi-circular cut-out regions in the edges of the elements 73. The disc elements of the other groups of discs can have plain edges.

However, it should be noted that, inpractice, all of the disc elements can be either scolloped or plain according to the particular application of the apparatus of the invention.

It will be noted from the drawings that the positioning of the disc elements of the groups 31A and 32A is such that the individual disc elements of these groups are effectively staggered relative to the disc elements of the group 30A so that the lines of cut of the disc elements of the groups 31A and 32A lie between those of the group 30A.

It will be noted that the disc elements 73 of the driven group 30A are arranged so that the dishing thereof is in a first sense, whilst the discs 83 of the remaining groups 31A and 32A are arranged so that the dishing thereof is in the opposite sense to said first sense. This arrangement has been found to be convenient during practical investigations of the capabilities of the apparatus of the invention.

If desired arrangements may be made for power driving all of the discs of the above discussed apparatus. It will be understood that the power driving of all of the disc elements would involve addition of extra gear box and chain drive arrangements to attain the extended power drive. Since such extension of the power drive would involve arrangements similar to those previously discussed it is not thought necessary to provide a detailed description.

It will be clear that, if thought convenient, two or more of the above described disc cultivator apparatas could be arranged for towing by the same towing vihicle. In such a case each cultivator apparatus can be either connected individually for towing and drive or connected to a common additional framework which is connected to the towing vehicle. This arrangement would have the result that the overall width of land cultivated during a pass of the apparatus is correspondingly increased.

It will be appreciated that when the apparatus of the invention is being used to cultivate the control member 26 will be pivoted to a position in which the wheels 10 move to a setting in which the main frame 1 is able to lower to enable the three sets of cultivator groups 30A, 31A and 32A to engage with the land to be cultivated.

When it is required to prevent such engagement the control member is moved to a position which by way of the control rods, the swing arms 28 and the link members 18 and 19 effectively lifts the rear end of the main frame upwards thereby lifting the cultivator element groups 30A, 31A and 32A away from the engagement setting. In practice, the control member 26 would be coupled to the conventionally provided control chains or the like which enable ready operation by a tractor driver from the tractor driving position.

If desired each wheel unit may be provided with an individual wheel height adjustment control to enable selective adjustment of the lift range of the main frame. One form of such adjustment could be a screwed extension to the shaft 14 and an associated operating handle which is effective to displace the shaft 14 up or down in the sleeve. Alternatively the plate 17 could be arranged to be selectively displaceable vertically of the sleeve, by operation of a suitable threaded arrangement.

It will be appreciated that the angular setting of the sub frame units 30, 31 and 32 may be different from that shown in the Figures. Thus for example, the rear units could be angled forwards rather than rearwards. Also the units could be parallel to each other and angled or one or the other of the units could be at rightangles to the direction of advance.

I claim:

1. Disc cultivator apparatus comprising an elongate main frame having a leading end and a trailing end; means at the leading end for enabling connection of the main frame to a towing vehicle;

a main sub-frame assembly including a first shaft, a first plurality of cultivator disc elements mountable in spaced relationship on the shaft and constrained to rotate therewith; a first elongate sub-frame adapted rotatably to mount the first shaft, and a first connection means for enabling the main sub-frame assembly to be mountable to the elongate main frame such that its position lengthwise of the main frame and its angular setting relative to the main frame may be separately and selectively set;

a drive transmission means for transmitting drive from a power source of the towing vehicle to the shaft to enable rotation of the shaft at a speed and direction independent of the rate of advance of the apparatus;

and a second sub-frame assembly including at least one-second shaft, a second plurality of cultivator disc elements mountable in spaced relationship on each second shaft a second elongate sub-frame for each said second shaft, each second elongate sub-frame being adapted rotatably to mount an associated second shaft, and second connection means for each second sub-frame assembly for enabling the associated assembly to be mountable to the main frame at a location to the rear of the main sub-frame assembly such that the associated assembly may be positioned lengthwise of the main frame and angularly set relative to the main frame independently of each other.

2. Disc cultivator apparatus as claimed in claim 1, and including at the trailing end of the main frame jockey type wheel units for supporting the trailing end of the main frame, when in a first position such that the pluralities of disc elements are raised above their operational positions, and when in a second position the disc elements are positioned for engagement with the ground.

3. Disc cultivator apparatus as claimed in claim 1, and including at the trailing end of the main frame castorable jockey wheel units each including a wheel mounted upon an axle carried by a support assembly having a shaft journalled in a vertical sleeve to allow the castoring action, and a wheel lift assembly for enabling the wheel units to be lifted or lowered relative to the main frame in such manner as to control the height of the trailing end thereof relative to the ground.

* * * * *